United States Patent [19]
Hammel

[11] 3,972,739
[45] Aug. 3, 1976

[54] RECHARGEABLE BATTERY WITH CURRENT LIMITING MEANS

[75] Inventor: Ronald O. Hammel, Englewood, Colo.

[73] Assignee: The Gates Rubber Company, Denver, Colo.

[22] Filed: Nov. 28, 1975

[21] Appl. No.: 636,258

[52] U.S. Cl. ............................... 136/181; 136/182
[51] Int. Cl.² .................................... H01M 10/48
[58] Field of Search ............... 136/181, 182, 166; 240/10.63

[56] References Cited
UNITED STATES PATENTS 3,233,092   2/1966   Umholtz ..................... 240/10.63
3,907,588   9/1975   Bergum ........................ 136/181

Primary Examiner—Donald L. Walton
Attorney, Agent, or Firm—Curtis H. Castleman, Jr.; Raymond Fink; H. W. Oberg, Jr.

[57] ABSTRACT

A battery and enclosure such as a rechargeable lantern battery housing a self-contained battery, and a recharge jack mounted in the enclosure, includes a low resistance, high power current-limiting means connected between one of the output terminals and the corresponding polarity terminal of the battery and which is provided with heat indicating means for determining if the output terminals of the battery have been short-circuited.

4 Claims, 1 Drawing Figure

RECHARGEABLE BATTERY WITH CURRENT LIMITING MEANS

BACKGROUND OF THE INVENTION

This invention relates to self-contained batteries disposed within an enclosure provided with means for rechargeing the batteries.

A problem with prior art lantern batteries, and the like, is the potential damage which can be done to the environment (e.g., fire hazard) or in some cases to the battery if the output terminals of the battery are short-circuited. One solution to this problem is the provision of a short-circuit relay or fuse connected so that a short circuit causes the relay to trip or fuse to operate to open the circuit and prevent damaging the battery.

It is also important to know if the battery has been subjected to a short circuit condition, as this will provide imformation which will permit the use of a proper regime for recharging the battery to bring it safely to its full capacity in minimum of time. An indication that the battery has been severely discharged may also assist the manufacturer in other respects.

Another problem which has existed with such batteries is not precisely allied with the above problem, but pertains to a situation where the output voltage of the battery is not compatible with the voltage withstand capability of the load. As an example, lanterns using batteries often customarily employ 5-volt lamps or bulbs. If the output voltage of the battery under load exceeds five volts appreciably, then the lamp may be ruined unless the voltage is stepped down to a safe level near five volts.

It is a primary object of this invention to overcome all the above problems without the use of a circuit breaker or fuse.

SUMMARY OF THE INVENTION

Briefly described, a rechargeable battery is disclosed having an enclosure, a self-contained battery or plurality of self-contained electrochemical cells disposed within the enclosure and having first and second terminals, output terminals mounted exteriorly on the enclosure, a recharge jack mounted exteriorly on the enclosure and having leads connected to the first and second terminals of the battery, the improvement comprising the provision of a low resistance, high power current-limiting means connected between one of the output terminals and the corresponding polarity first or second terminal of the battery, the current-limiting means bearing, or having in close proximity, heat indicating means for indicating whether a threshold level of current corresponding to a short-circuit condition across the output terminals had been carried by the current-limiting means.

BRIEF DESCRIPTION OF THE DRAWINGS

The invention will be described in its illustrated preferred embodiment in conjunction with FIG. 1 of the drawings which depicts in partial section, and in partial exploded view a rechargeable battery according to the invention.

PREFERRED EMBODIMENTS

Figure 1:
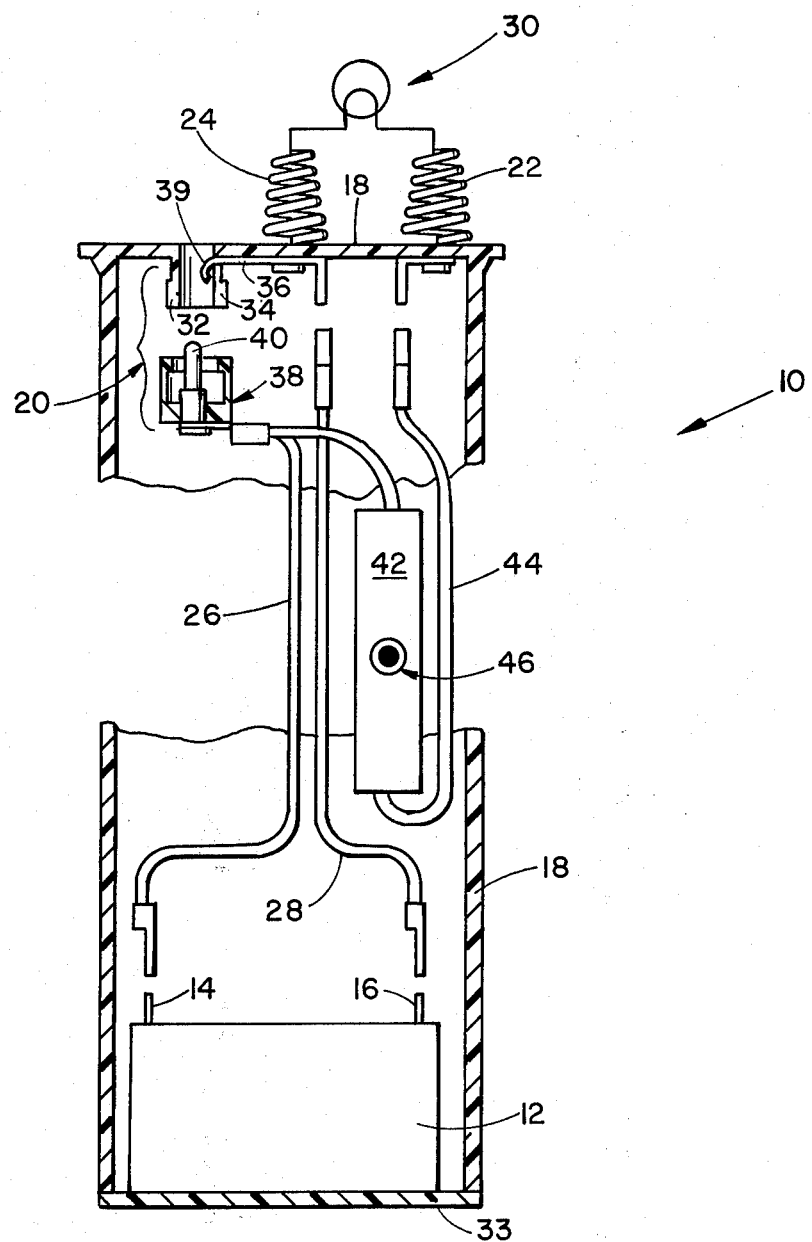

Referring to the FIGURE, the rechargeable battery (including its enclosure) is generally designated 10 and includes a self-contained rechargeable battery 12 which alternatively may be composed of a plurality of self-contained electrochemical cells connected in desired relation, an enclosure 18, 33 in which the battery is disposed, a pair of output terminals 22, 24 mounted on the enclosure, and a recharge jack 20 shown unassembled. From the recharge jack 20 emanates a pair of leads 26, 28 which respectively connect to opposite polarity first and second terminals 14, 16 of the battery. Lamp 30 is shown connected across the output terminals of the battery although it will be appreciated that various other types of loads could be connected to the battery.

The battery enclosure or case 18, 33 is made of a suitable electrically insulating material, such as plastic and includes a molded single piece top and side portion 18, including male jack portion 32, and a bottom portion 33 welded or otherwise affixed to the top container portion 18. The enclosure may suitably be of rectangular or cylindrical shape, for instance.

Recharge jack 20 is described in more detail in our co-pending commonly assigned application Ser. No. 636,259, filed concurrently herewith and incorporated by reference. As disclosed in that application, in addition to male cylindrical portion 32, which is provided with slot 34 to accommodate spring contact 36, there is also provided female portion 38 adapted to snap-fit over the male portion with the aid of interlocking shoulders, or otherwise mutually attached. The female jack portion 38 is also provided with a central contact post 40 which is normally disposed in spaced relationship with respect to resilient end contact portion 39 of the spring contact 36. As is customary, when a recharge plug of the coaxial type is engaged in the jack 20, the inner portion of the plug will make contact with contact post 40, while the outer portion of opposite polarity will make contact with spring end 39 and facilitate recharging of battery 12. Contact 39 is connected to one terminal of the battery 16 through conductive leg 28 and is also in contact through a rivet connection to output terminal 24. Similarly, contact post 40 is connected to terminal 14 of the battery through lead 26.

In accordance with the invention, there is provided a low resistance, high power current limiting means 42 which is connected between one of the output teminals, in this case terminal 22, and the corresponding polarity terminal of the battery, in this case terminal 14 via leads 44 and 26. The particular resistance and power rating of the device will be chosen according to the circumstances, including the particular voltage drop desired across the element 42, the temperature withstand capability of the battery 12 which will be in close proximity to the heat generating element 42, the maximum steady state current output desired, and size restriction, for instance. An example may best illustrate the factors involved.

EXAMPLE

Lamp 30 is a 5-volt device and battery 12 has a nominal open circuit voltage of 6 volts, being composed of three series connected 2-volt sealed lead-acid cells. It is thus desired to drop approximately 1 volt across resistive element 42. Since the standard lantern bulb draws about 500 ma, to achieve a 1-volt drop, a 2 ohm resistor 42 is employed. Thus, the current through the device will be limited to about 3 amperes so that selection of a 20 watt 2 ohm ± 10 percent bathtub type resistor will be sufficient to dissipate the heat generated upon short circuit of terminals 22 and 24. Under these short circuit conditions, the surface temperature of the resistor will reach about 210°C, which is compatible with the system.

Under the short circuit conditions described in the above example, it is desirable to determine, after the fact, whether the terminals of the battery had in fact been short circuited. This is accomplished by the placement of indicator means 46 on the resistive element which will reveal whether a certain threshold level of current corresponding to a short-circuit across the output terminals had been carried by the element 42.

The indicating means 46 can include a spot of temperature sensitive paint or crayon, for instance, which undergoes a transformation upon heating above the threshold level, thereby indicating that the temperature level (corresponding to the particular amperage) had been exceeded. The paint or crayon may, for instance, undergo a color change or transform from an initially dry opaque mark to a translucent liquid smear. As another example, the indicator 46 could be an adhesive-backed temperature monitor consisting of one or more heat-sensitive indicators sealed under a transparent circular window. The encircled indicators may turn black irreversibly at the threshold or rated temperature. Those skilled in the art will appreciate that other types of indicating means sensitive to the heat generated by the device may be utilized. The indicating means may be alternatively in close proximity to the resistor and still reflect the temperature reached within the battery.

Thus, element 42 with heat indicating means 46 not only limits the current output of the battery to a desired level, well below the potential maximum discharge current, and thus protect the environment and/or battery from damage. Simultaneously, indicator 46 provides an irreversible monitoring means or indicator of the current generated during some previous discharge of the battery.

It will be appreciated that the invention is capable of a variety of modifications and variations which will become apparent to those skilled in the art upon a reading of this specification, and which are intended to be included within the scope of the appended claims.

What is claimed is:
1. In a rechargeable battery having an enclosure, a self-contained battery or plurality of self-contained electrochemical cells disposed in the enclosure and having first and second terminals, output terminals mounted exteriorly on the enclosure, and a recharge jack mounted exteriorly on the enclosure and having leads connected to the first and second terminals of the battery, the improvement comprising:
   a low resistance, high power current-limiting means connected between one of the output terminals and the corresponding polarity first or second terminal of the battery;
   heat indicating means in close proximity or directly affixed to the current-limiting means for indicating whether a threshold level of current corresponding to a short-circuit across the output terminals had been carried by the current-limiting means.

2. The rechargeable battery of claim 1 wherein the current-limiting means is connected between one of the output terminals and one side of the recharge jack so that the current-limiting means conducts during discharging of the battery and does not conduct during recharging of the battery.

3. The rechargeable battery of claim 1 wherein the current-limiting means is a resistor.

4. The rechargeable battery of claim 1 wherein the heat indicating means is a mass of heat sensitive paint or crayon which undergoes a visual transformation when the threshold level of current is conducted by the current-limiting means.

* * * * *